United States Patent [19]

Nagano

[11] Patent Number: 4,690,663
[45] Date of Patent: Sep. 1, 1987

[54] REAR DERAILLEUR FOR A BICYCLE

[75] Inventor: Masashi Nagano, Izumi, Japan

[73] Assignee: Shimano Industrial Company Limited, Osaka, Japan

[21] Appl. No.: 869,610

[22] Filed: Jun. 2, 1986

[30] Foreign Application Priority Data

Jun. 17, 1985 [JP] Japan .............................. 60-91403[U]

[51] Int. Cl.⁴ ............................................ F16H 11/08
[52] U.S. Cl. ...................................................... 474/80
[58] Field of Search ................... 474/80, 82, 78, 3, 6, 474/83

[56] References Cited

U.S. PATENT DOCUMENTS 4,573,951 3/1986 Nagano .............................. 474/80 X
4,575,365 3/1986 Nagano ................................. 474/80

FOREIGN PATENT DOCUMENTS 156882 2/1983 Japan .

Primary Examiner—Stephen J. Novosad
Assistant Examiner—Thuy M. Bui
Attorney, Agent, or Firm—Stevens, Davis, Miller & Mosher

[57] ABSTRACT

The derailleur body is swingably supported to a fixing member through a first horizontal shaft and chain guide is swingably supported to a movable member at the derailleur body through a second horizontal shaft. A first spring and a second spring balance with each other to set a guide sprocket of the chain guide in position with respect to a desired one of multistage chain gears. A stopper plate is rotatably supported to and first horizontal shaft a retains one end of the first spring. The stopper plate includes an adjusting means which changes the position of the stopper plate with respect to an abutting projection at the fixing member to thereby adjust a twist angle of the first spring.

5 Claims, 8 Drawing Figures

U.S. Patent  Sep. 1, 1987  Sheet 1 of 3  4,690,663
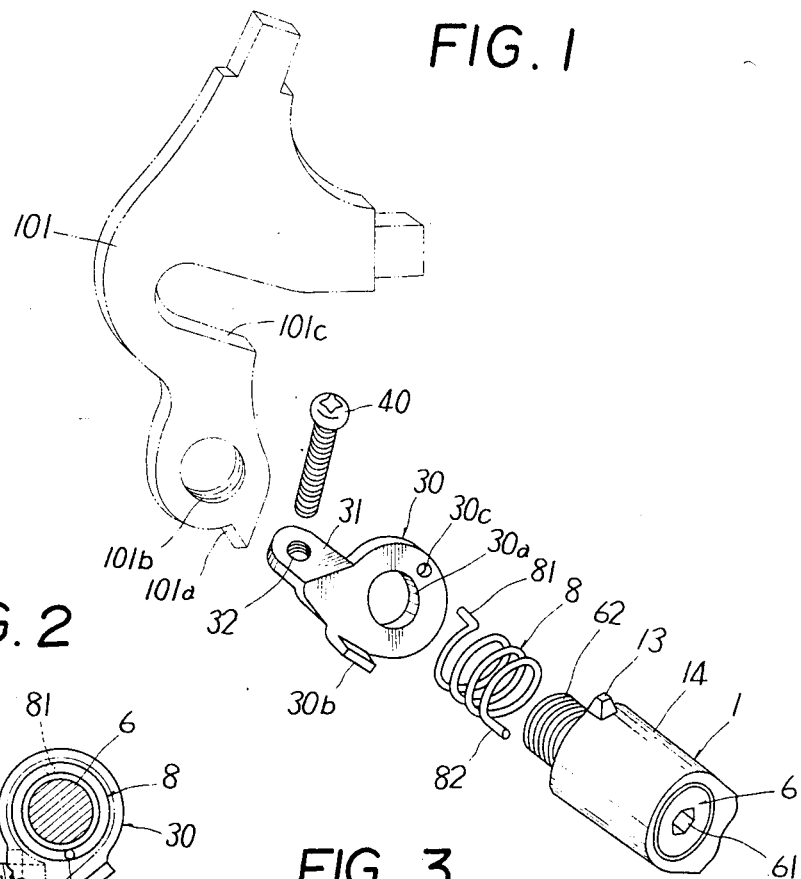
FIG. 1
FIG. 2
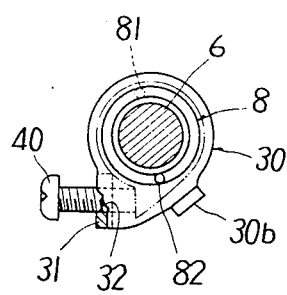
FIG. 3
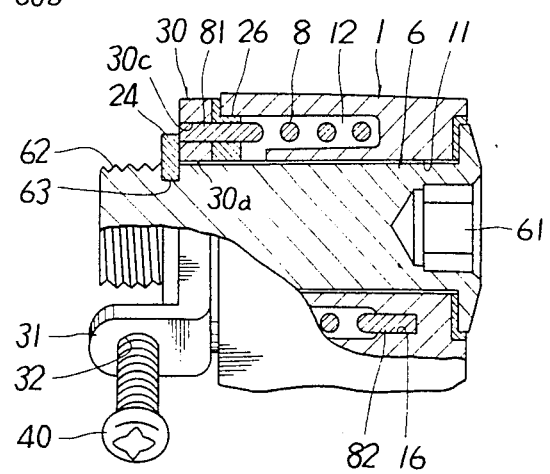

REAR DERAILLEUR FOR A BICYCLE

FIELD OF THE INVENTION

This invention relates to a rear derailleur for a bicycle, and more particularly to a rear bicycle derailleur which is supported to a fixing member fixed to the bicycle frame carrying thereon a multistage rear chain gear assembly so that a driving chain can be shifted selectively among the rear chain gears.

BACKGROUND OF THE INVENTION

This above type of rear derailleur has hitherto been disclosed in Japanese Patent Laid-Open Gazette No. Sho 59-156,882, which includes a derailleur body comprising a linkage mechanism provided with a base member, a pair of linkage members and a movable member. The base member is supported swingably through a first horizontal shaft to a fixing member fixed to the bicycle frame. A chain guide having a guide sprocket and a tension sprocket is supported swingably to the movable member through a second horizontal shaft, and first and second coiled springs are provided around the first and second horizontal shafts respectively. The first and second coiled springs balance with each other to set the guide sprocket in proper position in the radial direction of each rear chain gear suitable for shifting the chain thereto.

The conventional rear derailleur is provided with a stopper plate having a second stopper engageable with a first stopper provided at the base member. The stopper plate is fitted onto the first horizontal shaft and the first spring is retained at one end to the stopper plate and at its other end to the base member, so that, even before the derailleur body is fixed to the fixing member, the first spring can previously be held to the derailleur body. The stopper plate is provided with a positioning nose which, when the derailleur is mounted on the fixing member, abuts against an abutting projection provided thereon, thereby setting an initial position of the derailleur body, in other words, an angular phase thereof with respect to the axis of a hub shaft at the multistage rear chain gear assembly, and also setting an initial twist angle of the first spring.

The derailleur body is mounted on a fork end fixed to the bicycle frame, or on a bracket member fixed to the fork end. In either case, the fork end and bracket member each have a threaded bore screwable with the first horizontal shaft and the abutting projection to abut against the positioning nose at the stopper plate as described above. The first horizontal shaft screws with the threaded bore, thereby mounting the derailleur body to the fixing member, i.e., the fork end or the bracket member.

Thus, the initial position of the derailleur body and the initial twist angle of the first spring are determined when the derailleur body is mounted on the fixing member. When a driving chain stretched across a front chain gear and the rear chain gear engages with each sprocket at the chain guide, the first and second spring deflect to balance with each other, therby setting the guide sprocket in its position with respect to the rear chain gear.

The rear derailleur is sold separately as a bicycle part and incorporated in bicycles of various kinds. Although the multistage rear chain gear assemblies are similar in gear constitution, the fork ends are different in shape and size. If the size and shape of the fork ends are not compatable with the derailleur, the derailleur will not be properly mounted with respect to the axis of hub shaft, and in turn the axis of the multistage rear chain gear assembly. Hence, when the chain engages with the chain guide, a twist angle of the first spring will vary, with the result that the first and second springs will be unbalanced with each other and the guide sprocket will shift from its proper position with respect to the rear chain gear, thereby creating the problem in that the speed change efficiency is deteriorated.

The variation in the twist angle of the first spring is caused by the presence of a different distance between the axis of the hub shaft and the abutting projection at the fork end or a bracket member fixed thereto and also by a different tilt angle at the abutting projection, due to the various kinds of fork ends.

In order to solve the problem of variation in the twist angle of the first spring, the first horizontal shaft need only be loosened to correct a mounting angle of the derailleur with respect to the axis of the hub shaft. In this case, however, the first horizontal shaft tightly screwed must be once loosened to correct the angle of the derailleur body with respect to the axis of the hub shaft and thereafter the first horizontal shaft must be tightly rescrewed, thereby creating problems in that the correction is difficult work efficiency lowers, and much labor is required. In addition, the correction causes the positioning nose to disengage from the abutting projection, thereby shifting the derailleur, when in use, from the proper position with respect to the fixing member.

Also, the derailleur may be mounted on the fixing member in the condition in which the positioning nose at the stopper plate does not reliably abut against the abutting projection, thereby creating a problem in that the twist angle of the first spring varies to cause an imbalance between the first and second springs.

SUMMARY OF THE INVENTION

An object of the present invention is to provide a rear derailleur which is capable of correcting the twist angle of the first spring without unscrewing the first horizontal shaft from the fixing member for loosening the derailleur body therefrom is also capable of setting a guide sprocket in the proper position with respect to each rear chain gear by the balance of the first and second springs when the fixing member, e.g., a fork end, for mounting the drailleur body is of different kinds and the positioning nose at the stopper plate does not abut properly against the abutting projection at the fixing member so as to mount the derailleur body on the fixing member in condition of disconnecting the positioning nose from the abutting projection.

The present invention is characterized in that the rear derailleur for the bicycle, which is provided with first and second springs so that the guide sprocket is set in a proper position with respect to each rear chain gear by balancing the first spring with the second one, includes a stopper plate rotatably supported to the first horizontal shaft and is provided at the stopper plate with an adjusting means for changing the position of the positioning nose at the stopper plate with respect to the abutting projection at the fixing member so as to adjust the twist angle of the first spring.

The stopper plate is made rotatable by a rotation compensating means even in condition of fixing the first horizontal shaft to the fixing member. Hence, even with respect different kinds of fixing members, or when the derailleur body is not properly mounted on the fixing member, the adjusting means can be operated to correct the twist angle of the first spring while mounting the derailleur body on the fixing member, whereby the balance of the first spring with the second one can always set the guide sprocket in the proper position with respect to each rear chain gear.

The adjusting means preferably uses an adjusting screw. Alternatively, the positioning nose may be made to have a non-round section, and the adjusting means can comprise an adjusting member having a bore detachably fitted onto the positioning nose and at least two contact surfaces spaced at different distances from the center of the bore.

Thses and other objects, features and advantages of the invention will become more apparent upon a reading of the following detailed description and drawings.

BRIEF DESCRIPTION OF THE DRAWINGS

FIG. 1 is a perspective exploded view of the principal portion of a first embodiment of a rear derailleur of the invention, FIG. 2 is a sectional view of the principal portion of the first embodiment, FIG. 3 is a partially cutaway enlarged side view of the principal portion of the same.

DETAILED DESCRIPTION OF THE INVENTION

Figure 4:
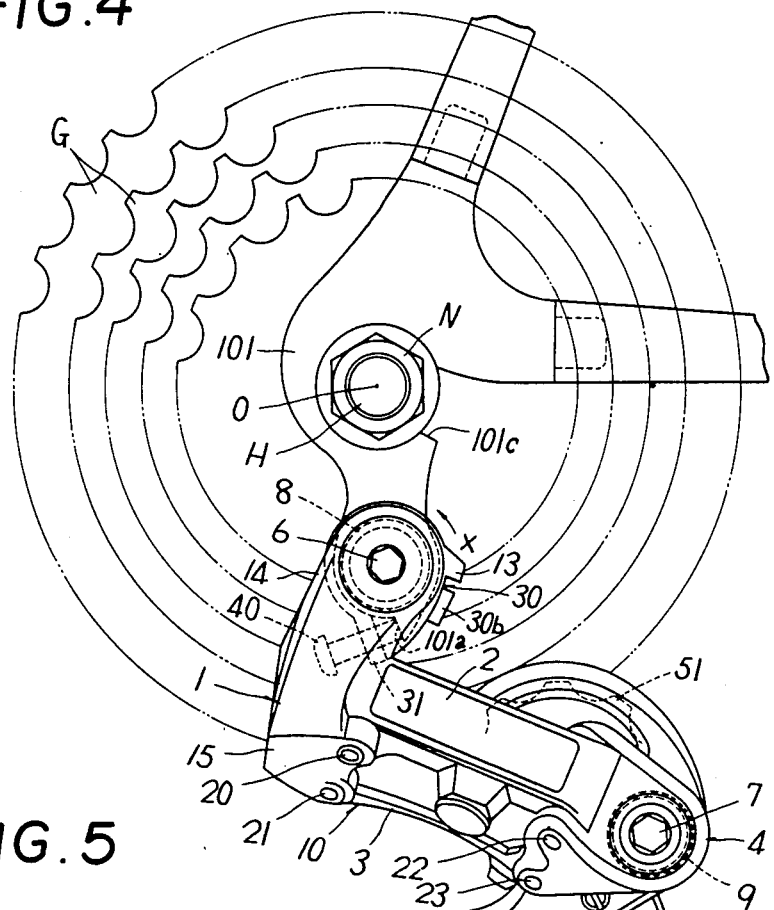
FIG. 4 is an illustration of the rear derailleur of the invention, mounted on a fork end at the bicycle.

A rear derailleur shown in FIG. 4 is mounted directly on a fork end 101 serving as a fixing member at the bicycle. The derailleur basically comprises a derailleur body comprising a linkage mechanism provided with a base member 1, a pair of linkage members 2 and 3 and a movable member 4; and a chain guide 5 having a guide sprocket 51 and a tension sprocket 52. The base member 1 is supported swingably to the fork end 101, which includes an abutting projection 101a and a threaded bore 101b, through a first horizontal shaft 6 screwing therewith. Chain guide 5 is supported swingably to the movable member 4 through a second horizontal shaft 7, and first and second coiled springs 8 and 9 are provided around the first and second horizontal shafts 6 and 7 respectively, so that the first spring 8 biases the derailleur body 10 clockwise in FIG. 4 and the second spring 9 biases the chain guide 5 clockwise in FIG. 4. Hence, the first and second springs balance with each other so as to set the position of the guide sprocket 51 radially with respect to each rear chain gear G.

Next, as shown in FIGS. 3 and 4, the base member 1 is provided at one lengthwise end thereof with a boss 14 having a through-bore 11 for rotatably supporting therein the first horizontal shaft 6, a cavity 12 receiving therein the first spring 8, and a first stopper 13. Base member 1 is provided at its other lengthwise end with a support portion 15 for pivotably supporting through a pair of pins 20 and 21 one end of the linkage members 2 and 3. First horizontal shaft 6 is inserted through the through-bore 11 and rotatably supports the base member 1.

The first horizontal shaft 6, as shown in FIG. 3, is provided at its head with a flange and a rotary control 61 and at the outer periphery of its utmost end with a screw thread 62 and an annular groove 63. Screw thread 62 screws with the threaded bore 101b at the fork end 101, thereby fixing the first horizontal shaft 6 thereto.

The first spring 8, as shown in FIG. 1., comprises a coiled portion and first and second spring ends 81 and 82 extending axially from the both ends of the coiled portion.

The movable member 4 is pivoted to the free ends of the linkage members 2 and 3 through a pair of pins 22 and 23. Chain guide 5 is fixed to the utmost end of the second horizontal shaft 7 supported rotatably to the movable member 4.

In the first embodiment shown in FIGS. 1 and 4, a stopper plate 30 having a positioning nose 31 opposite to the abutting projection 101a at the fork end 101 in the swinging direction of the base member 1 is supported rotatably to the first horizontal shaft 6. First end 81 of the first spring 8 is retained to the stopper plate 30, and the second end 82 of the same is retained in a retaining bore 16 provided at the cavity 12. Positioning nose 31 has a wide support face opposite to the abutting projection 101a and a threaded bore 32 with which an adjusting screw 40 screws. Adjusting screw 40 constitutes an adjusting means and abuts against the abutting projection 101a so as to adjust a twist angle of the first spring 8.

The stopper plate 30, as shown in FIG. 1, comprises a round plate having at the center a through-bore 30a and at one side a second stopper 30b extending one-sidedly thicknesswise and opposite to the first stopper 13 at the base member 1. The first spring 8 retained at the first spring end 81 into a retaining bore 30c provided at the stopper plate 30 is twisted to engage the second stopper 30b with the first stopper 13 at the base member 1. The through-bore 30a is fitted onto the outer periphery of the utmost end of the first horizontal shaft 6, so that the stopper plate 30 is supported rotatably thereto. The axial movement of stopper plate 30 is blocked by a snap ring 24 fitted into the annular groove 63. Hence, even when the first horizontal shaft 6 screws with the fork end 101, the rotation of stopper plate 30 is compensated. Also, the stopper plate 30 extends radially from a portion circumferentially shifted from the second stopper 30b so as to form an extension, which is bent perpendicularly to the surface of the stopper plate 30, thereby forming the positioning nose 31.

In addition, the stopper plate 30 is formed of a metal plate of about 2.6 mm in thickness. Also, the stopper plate 30, alternatively to being fitted rotatably onto the first horizontal shaft 6 as described above, may, as shown in FIG. 5, be fixed onto the outer periphery of a tubular shaft 25 having a bore 25a of a predetermined length, with tubular shaft 25 being supported rotatably onto the outer periphery of the first horizontal shaft 6. Thus, the stopper plate 30 can be supported stably thereto.

Figure 5:
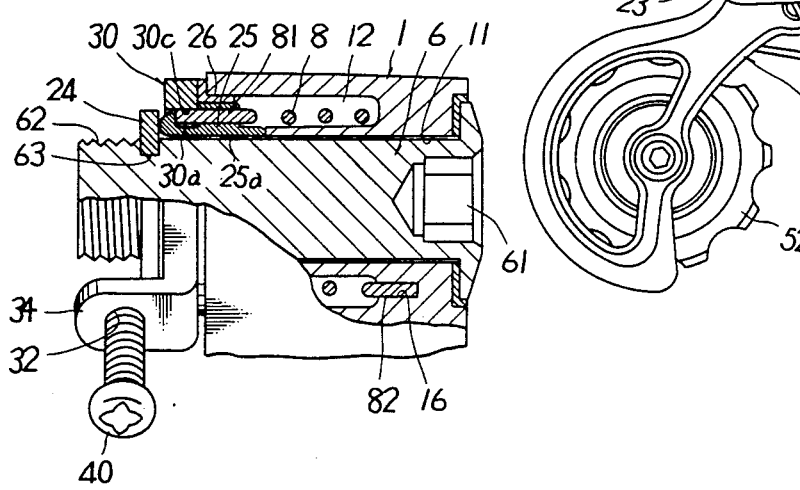
FIG. 5 is a partially cutaway exploded side view of the principal portion of a second embodiment of the rear derailleur of the invention.

In addition, in FIGS. 3 and 5, a bush 26 of synthetic resin is rotatably inserted into the base member 1 so as to prevent rain water from entering into the cavity 12 through a gap between the end face of the base member 1 and the stopper plate 30 and to reduce a rotational resistance of the base member 1 with respect to the stopper plate 30 when the derailleur body 10 swings around the first horizontal shaft 6.

The rear derailleur constructed as described above is mounted on the fork end 101 such that the first horizontal shaft 6 screws with the threaded bore 101b at the fork end 101 to allow the adjusting screw 40 to abut at its tip against the abutting projection 101a at the fork end 101.

Hence, the first horizontal shaft 6 is screwably fixed to the fork end 101, but the stopper plate 30 is not fixed thereto through the snap ring 24 to thereby be kept rotatable kwith respect to the first horizontal shaft 6. Base member 1 is mounted on the fixing member 101 swingably with respect to the first horizontal shaft 6.

In such mounting condition, the first spring 8 is given a predetermined twist angle, the first stopper 13 at the base member 1 abuts against the second stopper 30b at the stopper plate 30 by means of the spring reaction of spring 8, and the derailleur body 10 is mounted on the fork end 101 at a predetermined angle with respect to the axis of a hub shaft H as shown in FIG. 4, thus setting the initial position of the derailleur body 10.

In the above condition, when the driving chain engages with the guide and tension sprockets 51 and 52, the base member 1 swings counterclockwise in FIG. 4 against the first spring 8 and the chain guide 5 swings similarly against the second spring 9, whereby the first stopper 13 moves away from the second stopper 30b in the direction of the arrow X in FIG. 4.

Then, the springs 8 and 9 balance with each other so as to stop the chain guide 5, and in turn guide sprocket 51, at the proper position with respect to each rear chain gear G.

If the derailleur body is improperly mounted on the fork end 101 to have an improper mounting angle with respect to the axis O of the hub shaft due to its being mounted on a different kind of fork end 101 and as a result the twist angle of the first spring 8 varies when the chain engages with both sprockets 51 and 52 so as to cause the guide sprocket 51 not to stop at the proper position with respect to each rear chain gear G, the adjusting screw 40 can be rotatably operated by a common tool, such as a screw driver, so as to rotate the stopper plate 30 with respect to the first horizontal shaft 6 and shift the positioning nose 31 at the stopper plate 30 with respect to the abutting projection 101a at the fork end 101, thereby enabling the twist angle of the first spring 8 to be adjusted. As a result, the chain guide 5 can be corrected to be in the proper position with respect to each rear chain gear G, thereby improving the speed change efficiency.

If the twist angle of the first spring 8 varies because the derailleur body 10 is mounted on the fork end 101 in the condition that the adjusting screw 40 does not abut at its tip against the abutting projection 101a at the fork end 101, the adjusting screw 40 can be rotatably operated, thereby enabling proper correction of the twist angle of the first spring 8.

Alternatively, the adjusting screw 40 may screw with a separate member having a threaded bore and mounted to the positioning nose 31. Also, the positioning nose 31 may alternatively be separate from the stopper plate 30 and coupled therewith. Thus, the stopper plate 30 with the positioning nose 31 is not defined or limited by the construction described above. In addition, it is preferable to provide at the adjusting means 40 a locking means therefor.

Also, the adjusting screw 40 may alternatively be formed to be manually rotatably operated.

Figure 6:
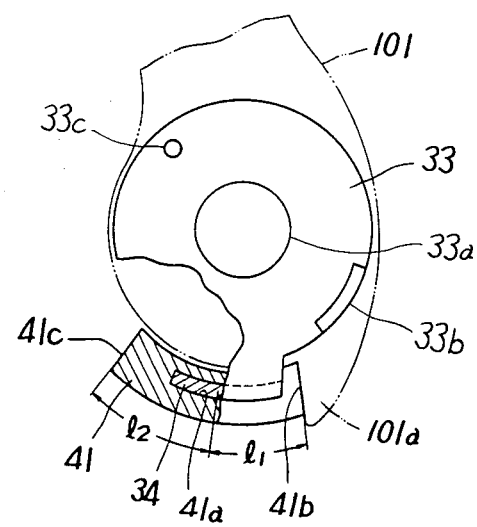
FIG. 6 is a partially cutaway front view of the principal portion of a third embodiment of the rear derailleur of the invention.

Alternatively, an adjusting member 41, as shown in FIG. 6, may be used as the adjusting means.

In this embodiment, a stopper plate 33, as shown in FIG. 6, includes an elongate extension having a non-round section and extending radially outwardly from the surface of the stopper plate 33, the extension being bent to be opposite at one lengthwise end to the abutting projection 101a, thereby forming a positioning nose 34. The adjusting member 41 is provided with a fitting bore 41a to be detachably fitted onto the positioning nose 34 and with two abutting faces apart at different distances $l_1$ and $l_2$ from the center of the bore 41a, and can be turned over to be fitted onto the positioning nose 34. As a result, positioning nose 34 can be changed in the position opposite to the abutting projection 101a to adjust the twist angle of the first spring 8. In addition, in FIG. 6, reference numeral 33a designates a through-bore through which the first horizontal shaft 6 passes. Reference numeral 33b designates a second stopper, and 33c designates a retaining bore into which the first end 81 of the first spring 8 is retained.

Also, the positioning nose 34 may alternatively be, for example, square in section and the adjusting member 41 may be quadrilateral to have at a central portion a square bore to be fitted onto the positioning nose 34 and form the abutting faces at four sides having different lengths respectively, thereby enabling the positioning nose 34 to be changed in position at four stages with respect to the abutting projection 101a.

Figure 7:
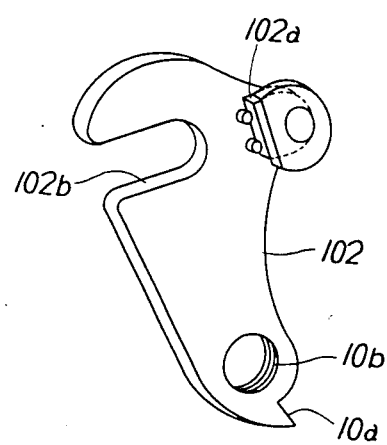
FIG. 7 is a perspective view of a bracket member, when viewed from the rear side thereof.

Alternatively, as shown in FIG. 7, a bracket member 102 having an abutting projection 10a and a threaded bore 10b may be used instead of the abutting projection 101a and threaded bore 101b at the fork end 101, so as to carry the derailleur body 10. In this embodiment, the first horizontal shaft 6 is previously screwed with the bracket member 102. In addition, the bracket member 102, as shown in FIG. 7, has a projection 102a and a hub shaft insertion groove 102b the same as those in the fork end 101.

As seen from the above, the rear derailleur of the present invention rotates the adjusting screw 40 in the first and second enbodiments and turns over the adjusting member 41 in the third embodiment so as to change the position of the positioning noses 31 and 34 with respect to the abutting projection 101a, thereby enabling the twist angle of the first spring 8 to be adjusted. Hence, even when the fixing members, such as the fork end, are of different kinds, or the positioning noses 31 and 34 are positioned improperly with respect to the abutting projection 101a when the first horizontal shaft 6 is fixed to the fixing member, the twist angle of the first spring 8 can be corrected by a simple operation. As a result, the guide sprocket 51 can always stop in the proper position with respect to each rear chain gear without being affected by the different kind of the fixing member, thereby preventing deterioration in speed change efficiency.

Also, the adjusting screw 40 or the adjusting member 41 is used to facilitate rotation of the stopper plate 30.

Figure 8:
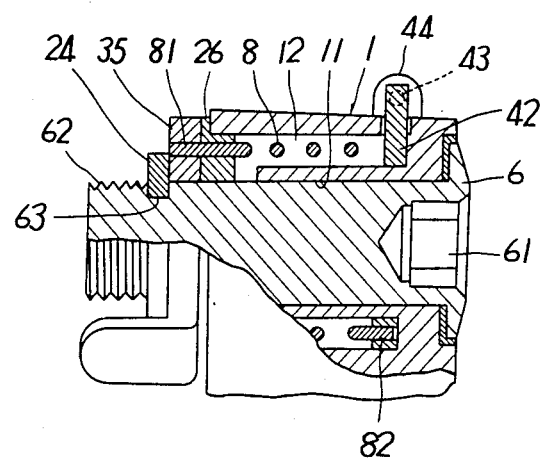
FIG. 8 is a partially cutaway front view of a fourth embodiment of the rear derailleur of the invention.

Furthermore, as shown in FIG. 8, the base member 1 may alternatively be provided with a spring holder 42 rotatable around the axis of the first horizontal shaft 6, and an adjusting screw 43 may be supported to the base member 1 through a support 44, so that the first spring 8 retained at its first end 81 to a stopper plate 35 is retained at its second end 82 to the spring holder 42. Adjusting screw 43 is operated to rotate the spring holder 42, thereby adjusting the twist angle of the first spring 8.

Although several embodiments have been described, they are merely exemplary of the invention and not to be construed as limiting, the invention being defined solely by the appended claims.

What is claimed is:

1. A rear derailleur for a bicycle, said derailleur being adapted to be mounted on a fixing member which is fixed to a frame of the bicycle and which has an abutting projection, said derailleur comprising:
   a derailleur body including (i) a base member having a first stopper and (ii) a movable member;
   a chain guide having a guide sprocket and a tension sprocket;
   a first horizontal shaft to be fixed to said fixing member, for pivotably mounting said derailleur body on said fixing member;
   a second horizontal shaft through which said chain guide is pivotally mounted on said movable member;
   a stopper plate having a positioning nose adapted to be positioned opposite to said abutting projection and a second stopper to abut against said first stopper;
   a first spring interposed between said base member and said stopper plate; and
   a second spring interposed between said movable member and said chain guide;
   said stopper plate including an adjusting means for changing the position of said positioning nose with respect to said abutting projection to thereby adjust a twist angle of said first spring.

2. A rear derailleur for a bicycle, said derailleur being adapted to be mounted on a fixing member which is fixed to a frame of the bicycle and which has an abutting projection, said derailleur comprising:
   a derailleur body including (i) a base member having a first stopper and (ii) a movable member;
   a chain guide having a guide sprocket and a tension sprocket;
   a first horizontal shaft to be fixed to said fixing member, for pivotably mounting said derailleur body on said fixing member;
   a second horizontal shaft through which said chain guide is pivotally mounted on said movable member;
   a stopper plate having a positioning nose adapted to be positioned opposite to said abutting projection and a second stopper to abut against said first stopper;
   a first spring interposed between said base member and said stopper plate; and
   a second spring interposed between said movable member and said chain guide;
   wherein said first spring is provided with a first spring end retained to said stopper plate and a second spring end retained to said base member, said base member being provided with an adjusting means cooperating with said second spring end to adjust a twist angle of said first spring.

3. A rear derailleur for a bicycle according to claim 1, wherein said first horizontal shaft has a rotation compensating means to allow said stopper plate to freely rotate with respect to said first horizontal shaft when said first horizontal shaft is being fixed to said fixing member.

4. A rear derailleur for a bicycle according to claim 1, wherein said adjusting means comprises an adjusting screw and said positioning nose at said stopper plate includes a screw supporting surface having a larger width than, and disposed opposite to, said abutting projection at said fixing member.

5. A rear derailleur for a bicycle according to claim 1, wherein said positioning nose at said stopper plate has a non-round section, said adjusting means includes an adjusting member having a fitting bore detachably fitted to said positioning nose and at least two abutting faces having different distances from the center of said fitting bore.

* * * * *

REEXAMINATION CERTIFICATE (3189th)

United States Patent [19]

Nagano

[11] B1 4,690,663

[45] Certificate Issued May 13, 1997

[54] REAR DERAILLEUR FOR A BICYCLE

[75] Inventor: Masashi Nagano, Izumi, Japan

[73] Assignee: Shimano Industrial Company Limited, Sakai, Japan

Reexamination Request:
No. 90/004,038, Dec. 8, 1995

Reexamination Certificate for:
Patent No.: 4,690,663
Issued: Sep. 1, 1987
Appl. No.: 869,610
Filed: Jun. 2, 1986

[30] Foreign Application Priority Data

Jun. 17, 1985 [JP] Japan ............. 60-91403 U

[51] Int. Cl.$^6$ ............................................. F16H 59/00
[52] U.S. Cl. ................................................. 474/80
[58] Field of Search ............................ 474/78, 80, 82, 474/3, 6

[56] References Cited

U.S. PATENT DOCUMENTS

| | | | |
|---|---|---|---|
| 3,364,763 | 1/1968 | Juy | 74/217 |
| 3,618,410 | 11/1971 | Nagano | 474/80 |
| 3,769,848 | 11/1973 | McGuire | 474/80 X |
| 4,135,727 | 1/1979 | Campagnolo | 474/80 X |
| 4,174,851 | 11/1979 | Huret | 474/80 X |
| 4,235,118 | 11/1980 | Huret | 74/217 |
| 4,274,828 | 6/1981 | Huret | 474/82 |
| 4,494,944 | 1/1995 | Coue | 474/82 |
| 4,573,951 | 3/1986 | Nagano | 474/80 X |
| 4,575,365 | 3/1986 | Nagano | 474/80 |
| 4,610,644 | 9/1986 | Nagano | 474/82 |
| 4,637,809 | 1/1987 | Nagano | 474/80 |

FOREIGN PATENT DOCUMENTS

| | | | |
|---|---|---|---|
| 2506251 | 11/1982 | France . | |
| 3406566 | 8/1984 | Germany . | |
| 3619034 | 12/1986 | Germany | 474/80 |
| 684211 | 12/1952 | United Kingdom | 474/80 |
| 722363 | 1/1955 | United Kingdom . | |

OTHER PUBLICATIONS

Publication, "Campagnolo Rear Derailleur for Large Ratios" prior Jun. 1986, 1 page.
Publication, "Rear Derailleur Success" prior Jun. 1986 1 page.

*Primary Examiner*—Roger Schoeppel

[57] ABSTRACT

The derailleur body is swingably supported to a fixing member through a first horizontal shaft and chain guide is swingably supported to a movable member at the derailleur body through a second horizontal shaft. A first spring and a second spring balance with each other to set a guide sprocket of the chain guide in position with respect to a desired one of multistage chain gears. A stopper plate is rotatably supported to and first horizontal shaft a retains one end of the first spring. The stopper plate includes an adjusting means which changes the position of the stopper plate with respect to an abutting projection at the fixing member to thereby adjust a twist angle of the first spring.

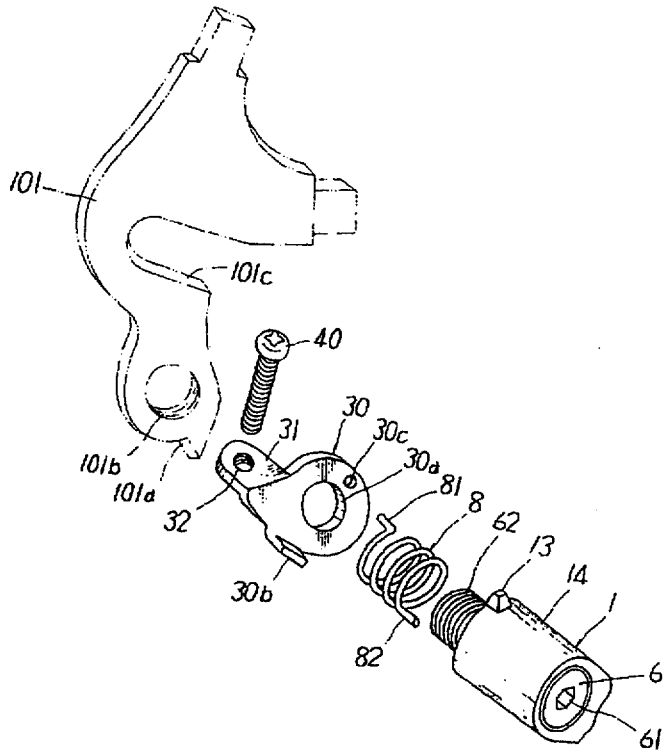

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5 is confirmed.

New claims 6–41 are added and determined to be patentable.

6. A rear derailleur for a bicycle according to claim 1, wherein said first spring has a first spring end coupled for moving with said stopper plate and a second spring end retained to said base member.

7. A rear derailleur for a bicycle according to claim 6, wherein said positioning nose includes a threaded bore, and wherein said adjusting means comprises a screw threaded into said threaded bore, said screw having an end for abutting against said abutting projection.

8. A rear derailleur for a bicycle according to claim 7, further comprising a bush disposed between said first horizontal shaft and said base member in close proximity to said stopper plate.

9. A rear derailleur for a bicycle according to claim 8, wherein said bush is formed from a resin material.

10. A rear derailleur according to claim 8, wherein said bush includes a radially extending portion disposed between an end of said base member and said stopper plate.

11. A rear derailleur for a bicycle according to claim 6, further comprising an annular shaft secured to said stopper plate for rotation about said first horizontal shaft, wherein said annular shaft includes an opening for receiving said first spring end therein.

12. A rear derailleur for a bicycle according to claim 11, wherein said stopper plate is fixed onto an outer periphery of said annular shaft.

13. A rear derailleur for a bicycle according to claim 12, further comprising a bush disposed between said annular shaft and said base member.

14. A rear derailleur for a bicycle according to claim 13, wherein said bush is formed from a resin material.

15. A rear derailleur according to claim 13, wherein said bush includes a radially extending portion disposed between an end of said base member and said stopper plate.

16. A rear derailleur according to claim 6, wherein said first horizontal shaft includes a peripheral groove, and further comprising a rotation compensating member fitted to said groove so that said stopper plate is rotatably supported about said first horizontal shaft between said rotation compensating member and said base member.

17. A rear derailleur for a bicycle according to claim 16, wherein said peripheral groove is an annular groove, and wherein said rotation compensating member comprises a snap ring fitted within said annular groove.

18. A rear derailleur for a bicycle according to claim 17, wherein said first horizontal shaft includes a threaded portion disposed on a free end thereof for fixing said first horizontal shaft to said fixing member.

19. A rear derailleur for a bicycle according to claim 18, wherein said first horizontal shaft includes a rotary control portion disposed on a head thereof.

20. A rear derailleur for a bicycle according to claim 6, wherein said stopper plate includes a retaining bore, and wherein said first spring end is inserted into said retaining bore.

21. A rear derailleur for a bicycle according to claim 20, further comprising a bush disposed between said first horizontal shaft and said base member in close proximity to said stopper plate.

22. A rear derailleur for a bicycle according to claim 21, wherein said bush is formed from a resin material.

23. A rear derailleur according to claim 21, wherein said bush includes a radially extending portion disposed between an end of said base member and said stopper plate.

24. A rear derailleur for a bicycle according to claim 2, wherein said stopper plate includes a retaining bore, and wherein said first spring end is inserted into said retaining bore.

25. A rear derailleur for a bicycle according to claim 24, further comprising a bush disposed between said first horizontal shaft and said base member in close proximity to said stopper plate.

26. A rear derailleur for a bicycle according to claim 25, wherein said bush is formed from a resin material.

27. A rear derailleur according to claim 25, wherein said bush includes a radially extending portion disposed between an end of said base member and said stopper plate.

28. A rear derailleur according to claim 2, wherein said adjusting means comprises:

a spring holder rotatably supported about said first horizontal shaft, said spring holder including a retaining opening, and wherein said second spring end is inserted into said retaining opening;

a support fixed to said base member;

a screw threadingly disposed in said support, said screw having an end for contacting said spring holder so that operation of said screw rotates said spring holder.

29. A rear derailleur for a bicycle, said derailleur being adapted to be mounted on a fixing member which is fixed to a frame of the bicycle and which has an abutting projection, said derailleur comprising:

a derailleur body including (I) a base member having a first stopper and (ii) a moveable member;

a chain guide having a guide sprocket and a tension sprocket;

a first horizontal shaft to be fixed to said fixing member for pivotably mounting said derailleur body on said fixing member, said first horizontal shaft having an annular groove;

a snap ring fitted within said annular groove;

a second horizontal shaft through which said chain guide is pivotably mounted on said movable member;

a stopper plate disposed between said snap ring and said base member so that said stopper plate is rotatably supported about said first horizontal shaft, said stopper plate having a positioning nose adapted to be positioned opposite to said abutting projection and a second stopper to abut against said first stopper, said positioning nose including a threaded bore;

a first spring interposed between said base member and said stopper plate, said first spring having a first end and a second end;

a second spring interposed between said movable member and said chain guide;

an annular shaft secured to said stopper plate for rotation about said first horizontal shaft;

wherein said stopper plate is fixed onto an outer periphery of said annular shaft;

wherein said annular shaft includes an opening for receiving said first spring end therein so that said first spring end, said annular shaft, and said stopper plate rotate as a unit;

wherein said second spring end is retained to said base member;

a screw threaded into said threaded bore, said screw including an end for abutting against said abutting projection for changing the position of said positioning nose with respect to said abutting projection to thereby adjust a twist angle of said first spring.

30. A rear derailleur for a bicycle according to claim 29, further comprising a bush disposed between said annular shaft and said base member.

31. A rear derailleur for a bicycle according to claim 30, wherein said bush is formed from a resin material.

32. A rear derailleur according to claim 30, wherein said bush includes a radially extending portion disposed between an end of said base member and said stopper plate.

33. A rear derailleur for a bicycle according to claim 29, wherein said first horizontal shaft includes a threaded portion disposed on a free end thereof for fixing said horizontal shaft to said fixing member.

34. A rear derailleur for a bicycle according to claim 33, wherein said first horizontal shaft includes a rotary control portion disposed on a head thereof.

35. A rear derailleur for a bicycle, said derailleur being adapted to be mounted on a fixing member which is fixed to a frame of the bicycle and which has an abutting projection, said derailleur comprising:

a derailleur body including (I) a base member having a first stopper and (ii) a moveable member;

a chain guide having a guide sprocket and a tension sprocket;

a first horizontal shaft to be fixed to said fixing member for pivotably mounting said derailleur body on said fixing member, said first horizontal shaft having an annular groove;

a snap ring fitted within said annular groove;

a second horizontal shaft through which said chain guide is pivotably mounted on said movable member;

a stopper plate disposed between said snap ring and said base member so that said stopper plate is rotatably supported about said first horizontal shaft, said stopper plate having a positioning nose adapted to be positioned opposite to said abutting projection and a second stopper to abut against said first stopper, said positioning nose including a threaded bore;

a first spring interposed between said base member and said stopper plate, said first spring having a first end and a second end;

a second spring interposed between said movable member and said chain guide;

wherein said stopper plate includes an opening for receiving said first spring end therein so that said first spring end and said stopper plate rotate as a unit;

wherein said second spring end is retained to said base member;

a screw threaded into said threaded bore, said screw including an end for abutting against said abutting projection for changing the position of said positioning nose with respect to said abutting projection to thereby adjust a twist angle of said first spring.

36. A rear derailleur for a bicycle according to claim 35, further comprising a bush disposed between said first horizontal shaft and said base member.

37. A rear derailleur for a bicycle according to claim 36, wherein said bush is formed from a resin material.

38. A rear derailleur according to claim 36, wherein said bush includes a radially extending portion disposed between an end of said base member and said stopper plate.

39. A rear derailleur for a bicycle according to claim 35, wherein said first horizontal shaft includes a threaded portion disposed on a free end thereof for fixing said horizontal shaft to said fixing member.

40. A rear derailleur for a bicycle according to claim 39, wherein said first horizontal shaft includes a rotary control portion disposed on a head thereof.

41. A rear derailleur according to claim 2 wherein the adjusting means is structured to adjust the twist angle of said first spring by moving said second spring end relative to said base member.

* * * * *